Jan. 22, 1957 T. A. BANNING, JR 2,778,436
CONTROLS FOR VARIABLE PITCH PROPELLERS AND THE LIKE
Original Filed Jan. 18, 1945 9 Sheets-Sheet 5

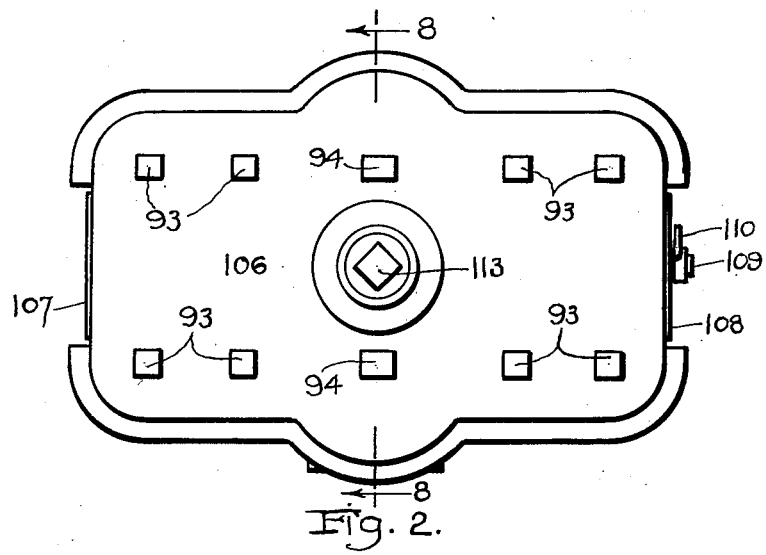
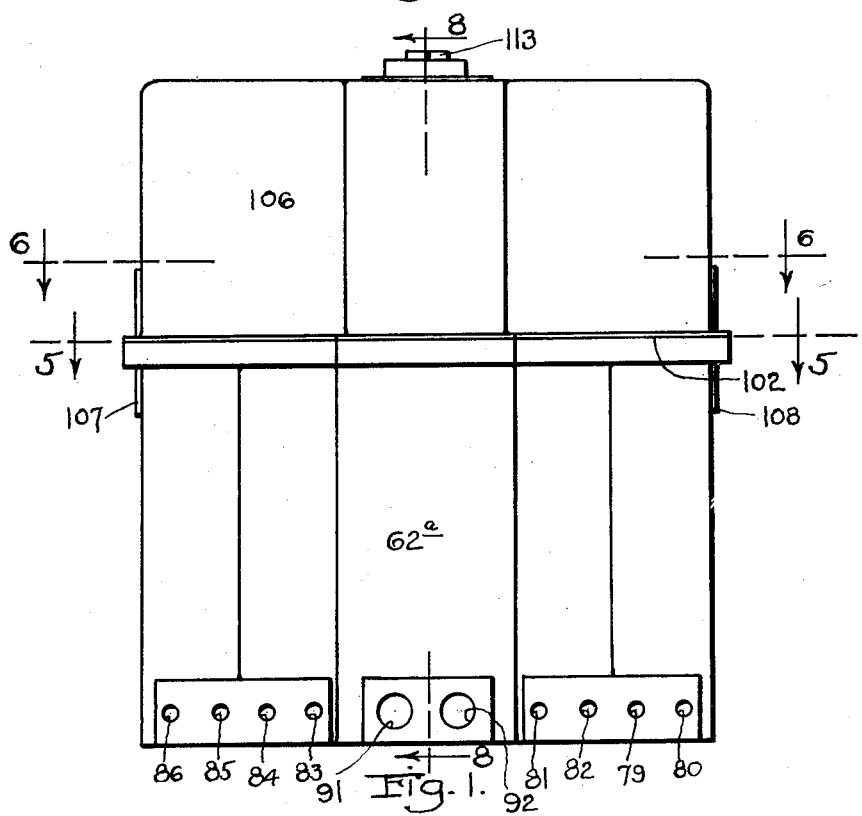

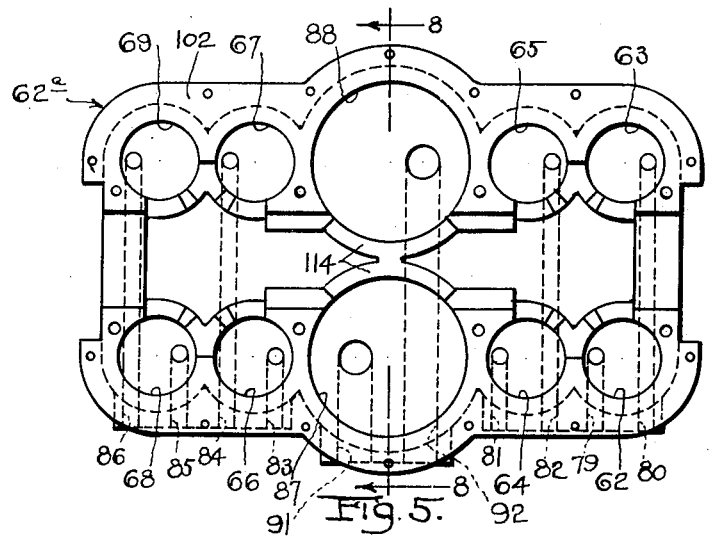
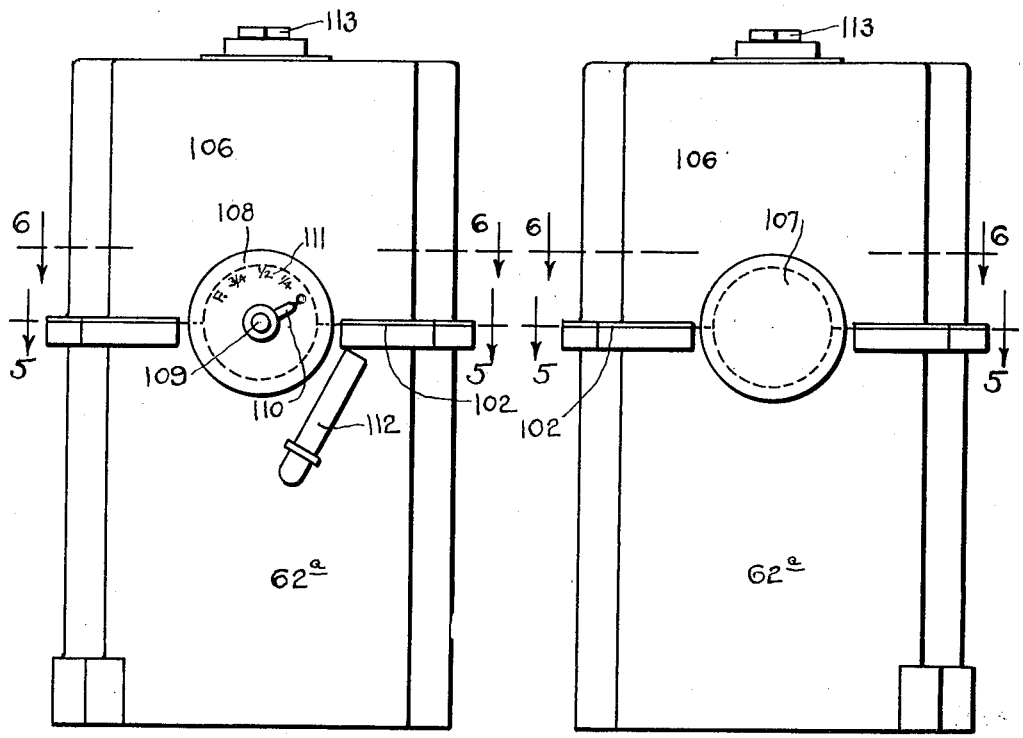

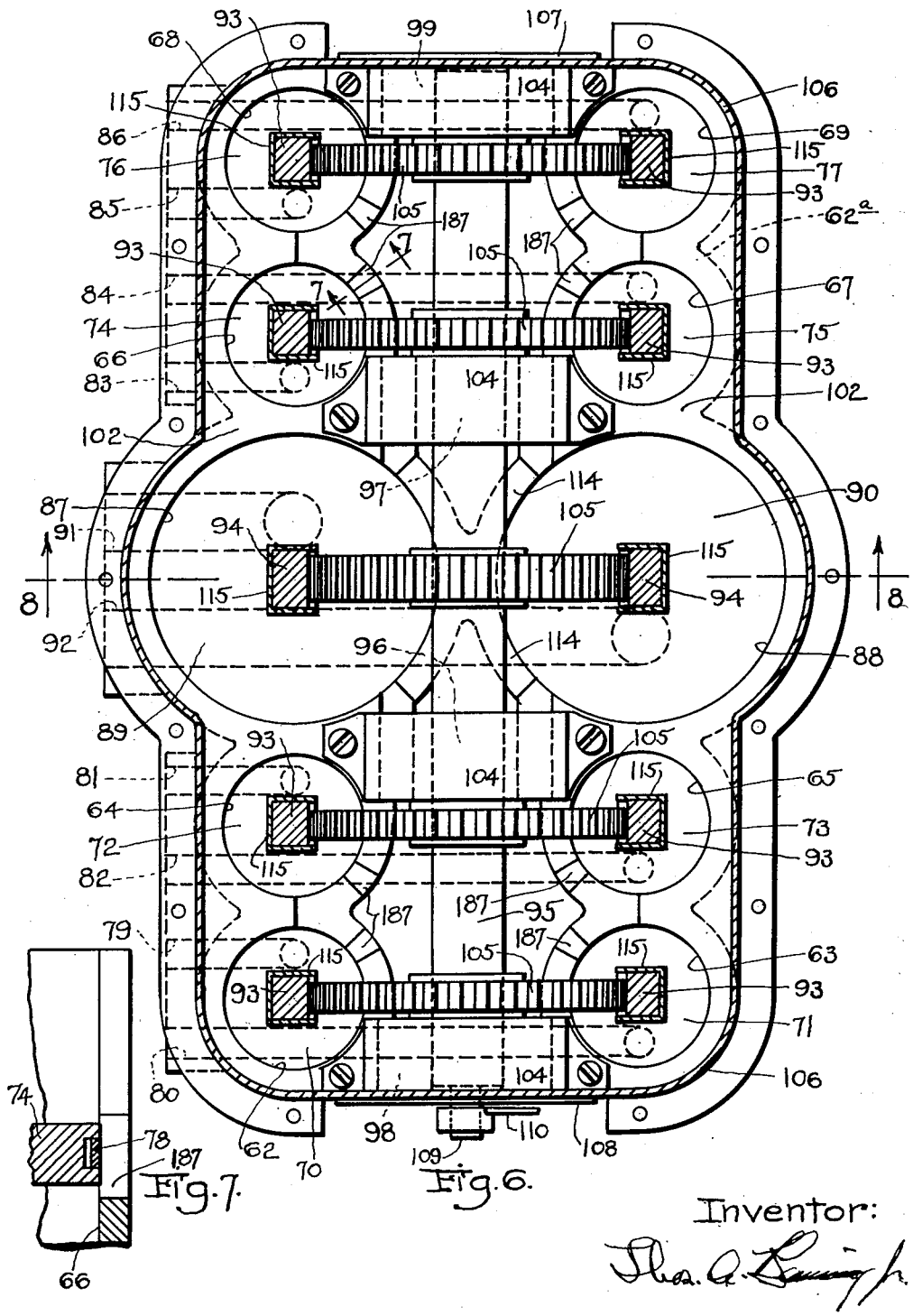

Inventor:
Thos. A. Banning Jr.

Jan. 22, 1957 T. A. BANNING, JR 2,778,436
CONTROLS FOR VARIABLE PITCH PROPELLERS AND THE LIKE
Original Filed Jan. 18, 1945 9 Sheets-Sheet 6

Inventor:

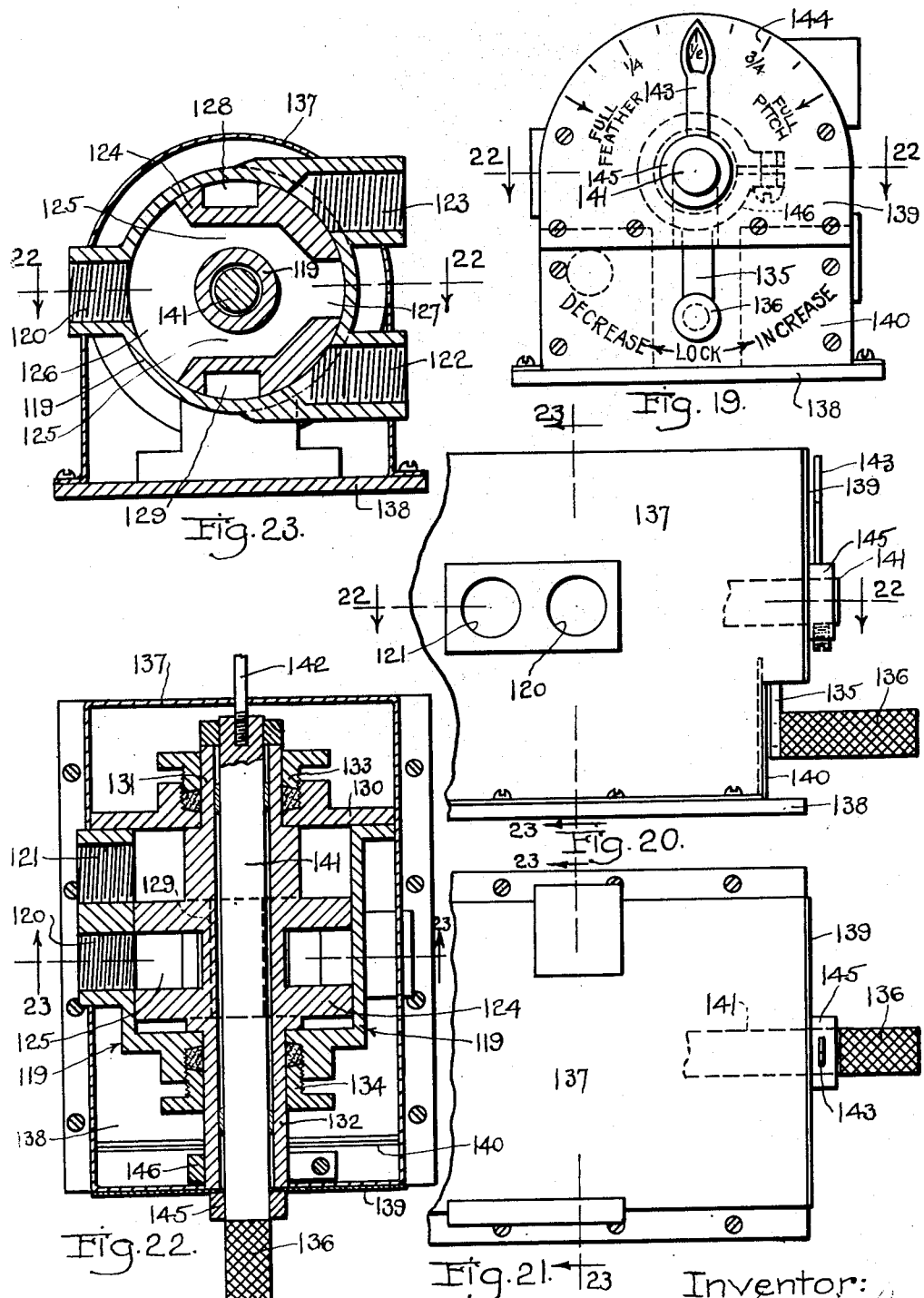

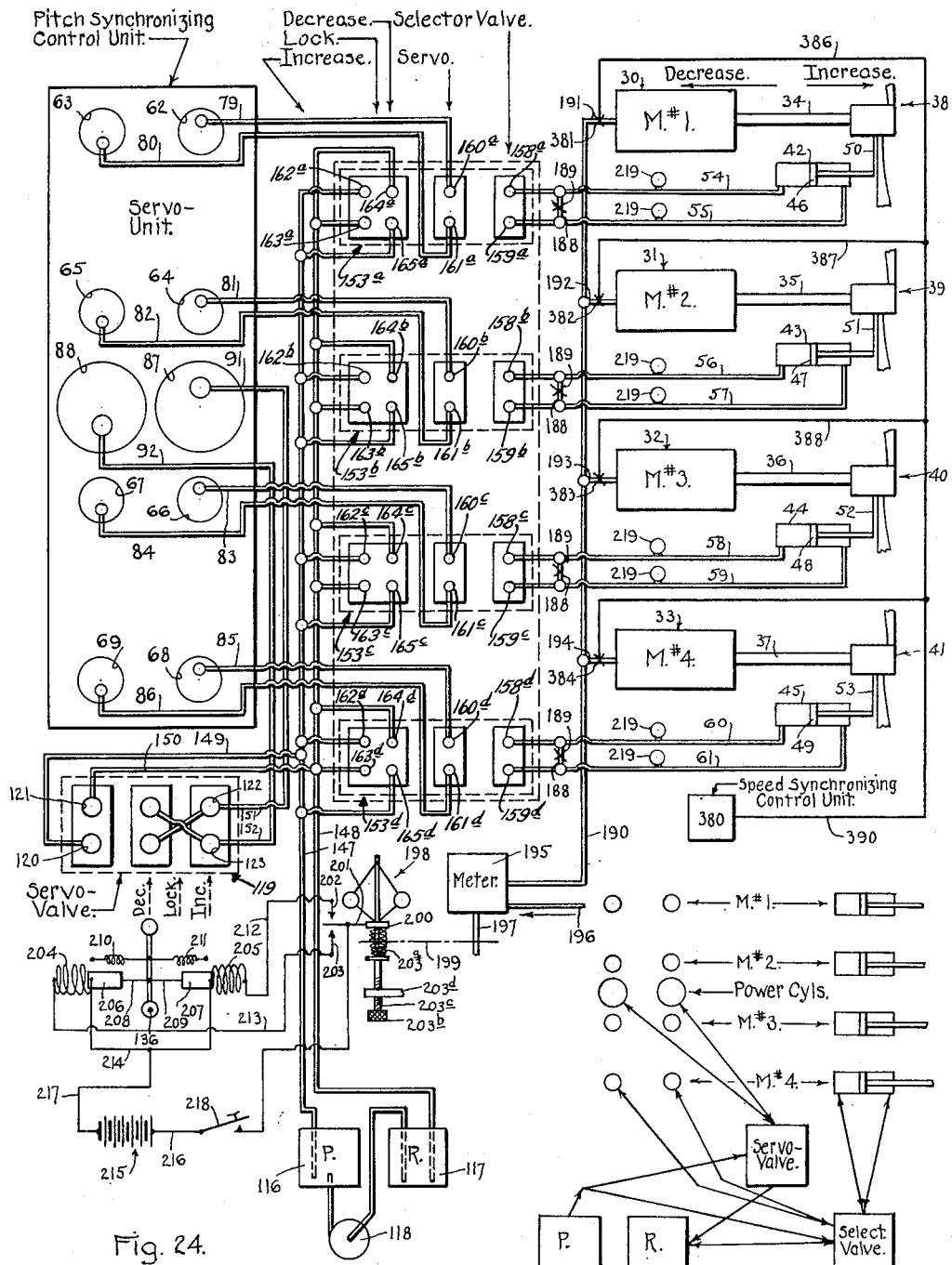

Jan. 22, 1957     T. A. BANNING, JR     2,778,436
CONTROLS FOR VARIABLE PITCH PROPELLERS AND THE LIKE
Original Filed Jan. 18, 1945     9 Sheets-Sheet 9

Inventor:

United States Patent Office 2,778,436
Patented Jan. 22, 1957

2,778,436

CONTROLS FOR VARIABLE PITCH PROPELLERS AND THE LIKE

Thomas A. Banning, Jr., Chicago, Ill.

Original application January 18, 1945, Serial No. 573,382, now Patent No. 2,569,444, dated October 2, 1951. Divided and this application September 28, 1951, Serial No. 248,699

18 Claims. (Cl. 170—135.2)

This invention has to do with controlling the pitches of blades and other functions of multi-motored airplane propellers, and similar functions. The invention has to do also generally with the controlling of functions of variable multi-grouped units, as will hereinafter appear. Specifically, however, said improvements have been devised with regard to the conditions and requirements in connection with variable pitch multi-motored airplanes such as large bombers, transport planes and the like, and I have illustrated and shall describe such application of the features of my present invention; but in so doing I wish it understood that I do not thereby intend to limit my improvements nor the protection afforded for their use, except as I may do so in the claims to follow. With the above in mind I shall first mention certain operating conditions in connection with such variable pitch multi-motored airplanes, in order that objects and purposes of my invention and its features may be better understood. This application is a division of my co-pending application for patent on Propeller Pitch Control, Serial No. 573,382, filed January 18, 1945, now Letters Patent No. 2,569,444, October 2, 1951.

The pull or "bite" which is exerted by the blades of a propeller depends on the pitch at which said blades are set, as well as the rotative speed, other factors such as size, form of blades, etc., remaining constant. In multi-motored airplanes means have heretofore been provided for varying the blade pitches, such pitch control being individual to each propeller; and the pulling efforts of the several propellers have been more or less non-synchronized, that is, not controllably related to each other. Even when the controls of pitch variation for the several propellers have been interconnected, there has not been assurance that all the blade pitches of all the propellers would be the same at any given time or condition of the controls. It is an object of the present invention to provide means whereby, if desired, there will be definite assurance that the pitches of all the propeller blades will be the same for any selected condition of adjustment of the manual or other controls.

In connection with the foregoing it is a further object of the invention, as a detail, to provide hydraulic or fluid means for effecting the blade shifting and adjustments of the propeller blades, suitable valve means being provided for controlling the admission and discharge of the liquids for shifting the blades of the several propellers. Generally such fluid means is operated by use of a suitable composition of oil or oils, in well understood manner. When such liquid is delivered to a blade shifting plunger under control of a simple valve it is evident that the amount of blade shift, and the final blade pitch caused by such shift, will depend on various factors, including the rate at which the shifting mechanism responds, the frictional resistance of the operating parts, and other factors which are of a variable nature. It is a prime object of my present invention to make provision for ensuring that when the control valve for a group of blade shifting devices is actuated to cause blade shifting, all the blade shifting devices for the several propellers will be actuated by exactly equal amounts, so that there will be assurance that the blades of all the propellers acted upon will reach and retain exactly the same pitch conditions. In other words, this feature of my invention has to do with the provision of means whereby during gang control of two or more blade shifting devices there will be assurance that all said devices will move to and assume exactly the same positions, and that the blades of all the corresponding propellers will be brought to and retained at the same condition of pitch adjustment.

In connection with the foregoing feature it is a further object of the present invention to ensure said results without the need of providing mechanical or like connections between the controlling station or stand and the blade pitch actuating devices (other than the liquid itself whereby the shifting is effected), thereby simplifying the installation, and also reducing the possibility of failure thereof during service. In certain embodiments disclosed in my co-pending application for patent on Improvements in Controlling Speed, Power, and other Functions of Multi-Motored Airplanes and the Like, Serial No. 459,336, filed September 22, 1942 (now Patent No. 2,612,956, issued October 7, 1952), I have disclosed servo-motor means for shifting the blades of the propellers, but some of said schemes there disclosed require the provision of mechanical or electrical connections between the blade shifting devices and the control element. The present disclosures herein made eliminate the need of any such mechanical or like connections between the control element or device and the blade shifting means, and still make provision for ensuring the desired control of blade positioning and adjustment, as hereinbefore stated.

In connection with the foregoing it is a further object of the present invention to make provision for giving to the pilot or other control officer at all times an exact indication of the blade pitches of the propellers being so controlled, said indicating means operating in exact accordance with the blade shifting operations. Said indicating means may be graduated to read in degrees of pitch, or in percentage of pitch, or other suitable designations.

In connection with the foregoing mentioned objects it is a further object of the invention to make provision for actuating all of the blade shifting devices for the several propellers either as a gang or individually, as desired; or in other cases for selecting two or more blade shifting devices of a larger group and treating them in gang, operating the other non-ganged devices individually. In other words, this feature and object has to do with provision of a fully selective arrangement, whereby the pilot or operator always has it fully in his control to select and group the several blade shifting devices according to his desires, or according to the necessities of the occasion, due, for example to disablement of one or more shifting devices in service, as by enemy fire. In this connection I have provided valve means for controlling the delivery and release of operating fluid to the several blade shifting devices, whereby each of said devices is individually controlled; together with gang means for joining together any selected ones of said controlling valve means, leaving the others for individual actuation.

A further object of the invention relates to the provision of means for delivering fluid to the several blade shifting devices directly from a suitable source of such actuating fluid under pressure; or through the medium of a servo-actuated fluid pressure device. Said servo-actuated fluid pressure device includes means to deliver fluid to each of the blade shifting devices individually, and likewise to provide for release of fluid from each of the blade-shifting devices as required. Said servo-actuated device also includes power means for its actuation under control, so that the power actually required for blade shifting operations is derived from a suitable power mechanism.

Due to the fact that the power transmitting medium may comprise oil or other suitable fluid which is substantially noncompressible I have also made provision for cutting out or by-passing those elements of said servo-actuated device which are not momenatrily in gang connection with their several blade shifting devices, to thereby prevent interference with proper operation of the servo-device when full gang operation is not being used.

It is a further object of the invention to provide a very simple form of this servo-actuated device, consistent with the number of blade shifting devices to be served thereby; and also to provide a very rugged and durable form of such servo-device. A further object in this connection is to provide a construction of this device which can be very readily built by simple manufacturing and machining operations, and at relatively low cost, and of comparatively small weight.

A further object is to make provision for readily filling and keeping filled said servo-device with the required actuating fluid, and for giving an indication at all times as to the condition of filling of fluid therein.

A further feature of the invention relates to the provision of a very simple form of selector-valve for controlling the flow of actuating fluid to each of the several blade shifting devices. In this connection it is an object to provide a form of such valve which is substantially leakproof, and such that the fluid packings are at all times subjected to low pressure or return fluid, so that the tendency to leakage is reduced to a minimum. Also, to group the several fluid connections to said valves in simple and readily accessible groupings so as to simplify installation and adjustment of said connections from time to time as needed.

In connection with said selector-valve arrangement it is a further object of the invention to make provision for readily grouping two or more of said valves together into a mechanical gang so that they may be initially brought together into the desired gang relationship. In this connection it is an object to make provision for such gang installation without the need of extremely accurate initial construction and machining of said valve assemblies, and still to ensure suitable and proper gang operation thereof when so assembled. In this connection it is an object to provide for actuation of said valve assemblies in gang by means of a suitable rock shaft under pilot control. It is a further object of the invention to make provision for readily connecting and disconnecting each of said valve assemblies to and from such rock shaft, according to the ganging of the several controls which may be desired by the pilot.

In connection with the foregoing it is a further object of the invention to make provision for individual operation of each of these valve assemblies by the pilot when individual operation is desired, or connecting the same to said rock shaft operator when desired for gang control.

It is a further object of the invention to provide a very simple form of servo-valve for control of the servo-unit. In this connection it is an object to provide a form of such valve which may be simply constructed and assembled, and which will be readily maintained in fluid tight condition.

It is a further object of the invention to provide these various units of the complete assembly as distinct units which may be installed at suitable and convenient positions in the airplane or other ship; and with simple oil or other fluid lines properly connecting them together.

Sometimes it may be desired to provide means for actuating the blade pitches according to total power being developed by the several power-motors. In such case I have also made provision for automatic control of the blade pitches as a group, and according to the variations of power supplied by such group.

It is a further object of the invention to make provision for locking the blade pitch changing devices in adjusted position without the need of mechanical or electrical connections between said devices and the control stand or other position, other than the tubes whereby the fluid is passed between the parts; and for ensuring that the responses and movements of said blade pitch changing devices will always be in exact accord with the adjustments as made by the pilot or engineer. Also, in this connection to give indications to said pilot or engineer as to the exact pitch conditions of the blades at all times, and without the need of any mechanical or electrical connections from the pitch shifting devices to the control position.

A further feature and object of the invention is to make provision for control of the pitches of the propeller blades for any kind of craft, either air or water borne. A further feature is to make provision for subdivision of all the propellers of a multi-motored airplane or other craft into groups which may be separately controlled for various purposes. For example, in the case of a four-motored airplane, with two propellers at each side of the medial line of such plane, it may sometimes be desirable to so adjust the propellers at one side of such medial line as to exert a greater pull than those to the other side of such medial line, in order to assist in executing rapid turns, and for other reasons in connection with maneuverability of the airplane. I have made such provision in the present case.

Sometimes, also, it may be found desirable to be able to reverse one or more of the propeller pitches, in order to exert a braking action thereby. I have made provision for such action herein.

A further object of the invention is to make provision for turning and controlling the turning and other maneuvers of turrets of warcraft, such as airplanes, etc. In this connection it is an object of the invention to make provision for group turning thereof, from a suitable control stand such as the location of a master gunner, to thereby bring the control of said turrets to a common point for group fire control.

A further feature of the present invention concerns an improved method of synchronization and the means provided to make the same effective. It is here noted that the pull (or push) of the blades of a rotating propeller (or other moving airfoil) on the body of air (or liquid) within which it is moving is dependent on speed of displacement of such blade or blades or airfoil with respect to such body of air (or liquid) and also on the section of such blade and the angle of attack. In the case of a propeller blade the angle of attack is determined by the form of the blade (measured radially along its length) as well as its "pitch"; and since it is universal practice to so form the blade as to present a varying surface along its length (radius) commencing with a steep angle near the hub or stub and lessening to a small amount at the tip, it is customary to entitle the "pitch" of the blade as a whole, as that "pitch" at some specified point, generally 75% of its full radius. The variable pitch blade scheme then makes provision for rotating the blade or blades on its or their radial axis. As this "pitch" is increased the pull or reaction on the surrounding body of air increases to a maximum for a pitch of 12–15% (degrees) (from the direction of engagement with or meeting the air stream), and then decreases for greater "pitches."

With well designed and fabricated blades of equal size and specifications the reactions of all blades of a series of propellers of a given airplane will be substantially equal for equal rotative speeds, and for equal blade "pitch" settings; so by synchronizing the speeds of such propellers which have been set to the same pitch, it is possible to ensure equal pulls (or pushes or reactions) for all the propellers on the body of air (liquid) within which the structure is functioning.

It is therefore a further object and function of the present invention to provide, in an airplane (or other vehicle), of the multi-motored, multi-propeller type, means to effect synchronism of speed of the several power-motors and their propellers, and also means to effect synchronism of blade settings of the several variable pitch blade propellers; and to make provision for definite assurance that all of the blade pitches will be brought to and held at the same values, as well as assurance that the several units will be brought to and maintained at synchronism for speed. And it is a further object to accomplish these results in combination with many of the objects and results hereinelsewhere stated.

A further feature is to provide a form of hydraulic pitch control and variation device which may, if desired, be locked in any given pitch angle, under control of the pilot.

It is a further object to provide a very simple form of blade pitch control device, one which may be built very sturdy and rugged in construction, one which will not readily get out of order, and one which is well adapted to carry the large forces generated in operation, and transmit them properly between elements intended to receive them.

A further feature relates to the provision of a speed control feature in connection with the blade shifting devices herein, so that if desired, the speed of rotation will automatically readjust the blade pitches to new positions.

It is a further feature of the invention that slight leakages of oil under pressure at the locations of the blade shifting elements will not interfere with normal functioning thereof; such result being obtained due to the fact that the blade settings and controls are effected by oil pressures which are controlled and maintained by the pilot's control device.

Other objects and uses of various of the features of invention will appear from a detailed description of the drawings hereinafter disclosed.

In the drawings:

Figure 1 shows a front elevation of the servo-unit whereby the actuating fluid for the several blade shifting devices are simultaneously displaced in exactly equal amounts for all the blade shifting devices being actuated, and by use of power supplied from a suitable source;

Figure 2 shows a plan view corresponding to Figure 1;

Figure 3 shows a front end elevation corresponding to Figures 1 and 2;

Figure 4 shows a back end elevation corresponding to Figures 1, 2 and 3;

Figure 5 shows a plan view of the base section of the servo-unit with the cover and operating parts removed therefrom; being a section on the lines 5—5 of Figures 1, 3, 4 and 8, looking in the directions of the arrows;

Figure 6 shows a plan section on the lines 6—6 of Figures 1, 3, 4 and 8, looking in the directions of the arrows, the operating parts being in place;

Figure 7 shows a fragmentary vertical section on the line 7—7 of Figure 6, looking in the direction of the arrows, and it shows the compensating opening for one of the fluid cylinders of the servo-unit;

Figure 8:
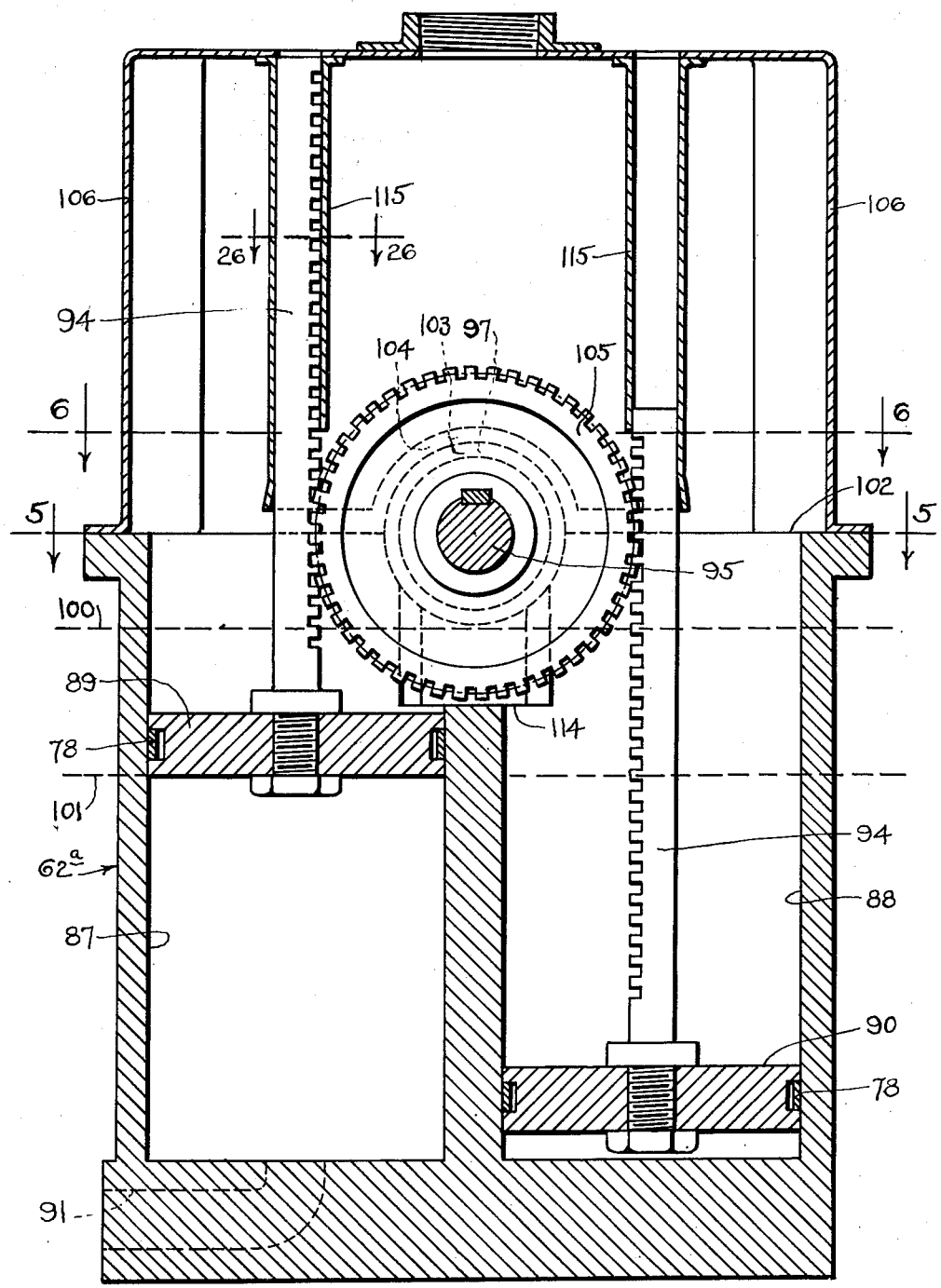
Figure 8 shows a vertical cross-section on the lines 8—8 of Figures 1, 2, 5 and 6, looking in the directions of the arrows.
Figure 11:
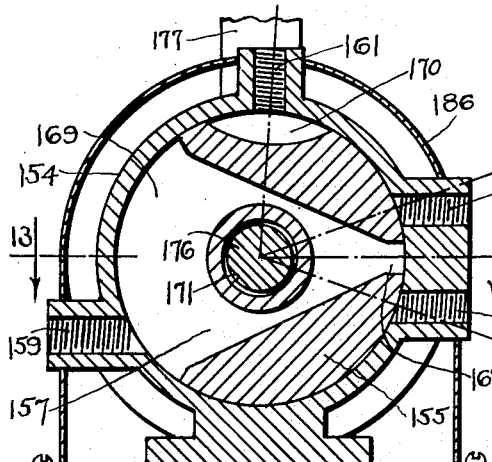
Figure 12:
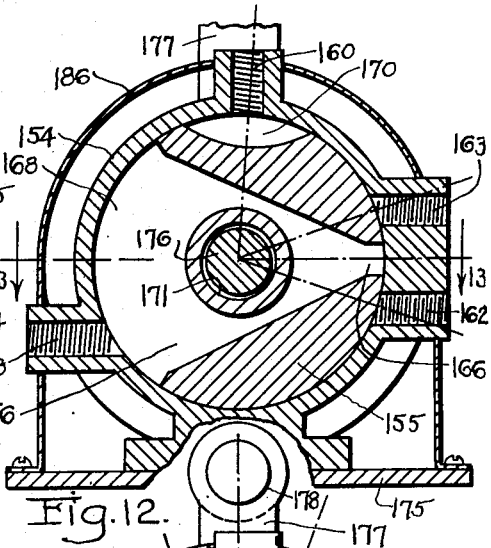
Figure 13:
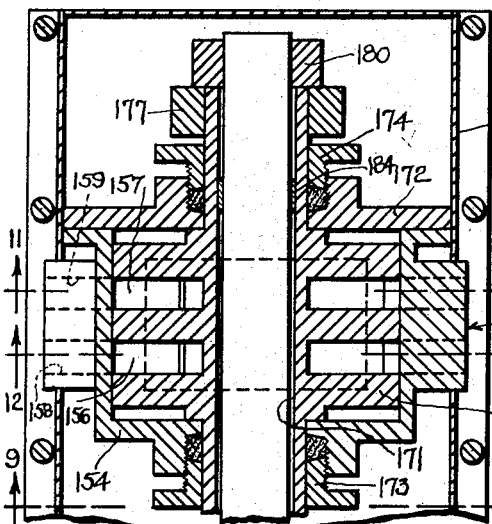
Figure 9:
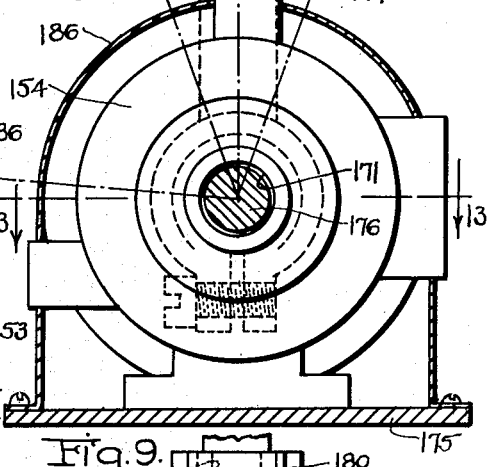
Figure 10:
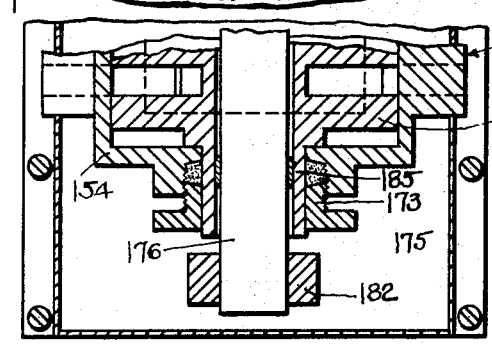
Figure 14:
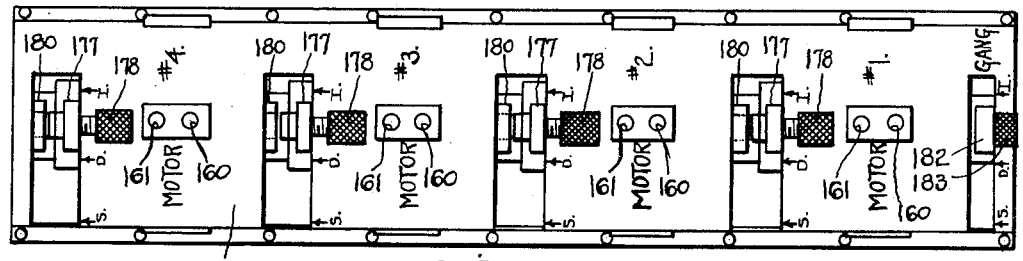
Figure 15:
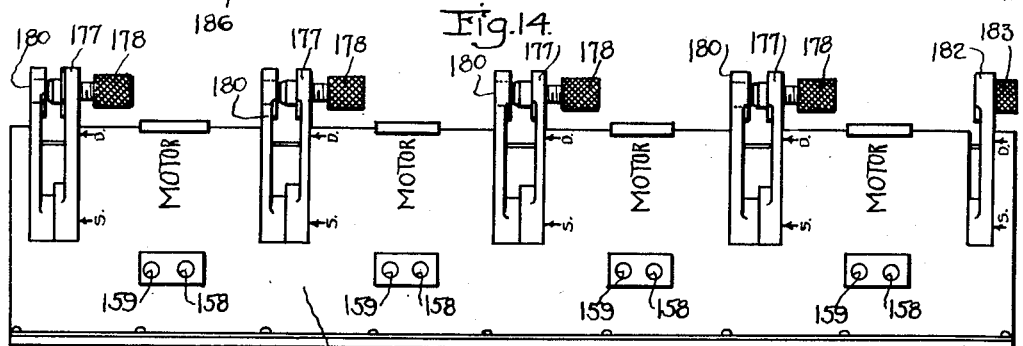
Figure 16:
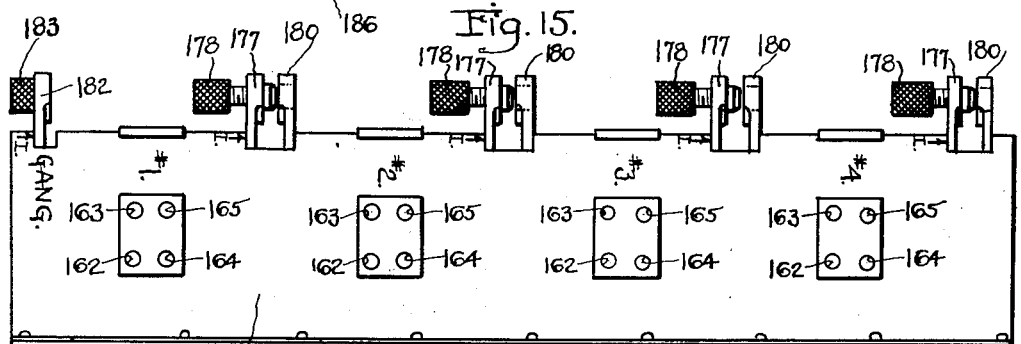
Figure 17:
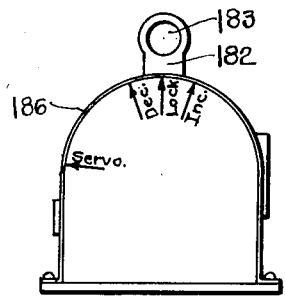
Figure 18:
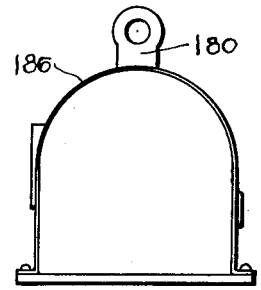
Figure 26:
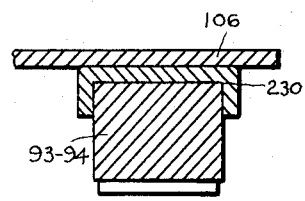
Figure 27:
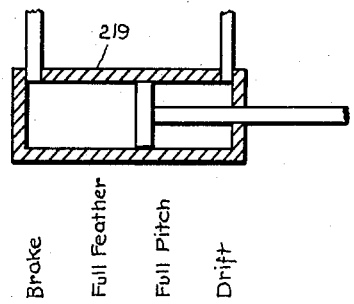
Figure 28:
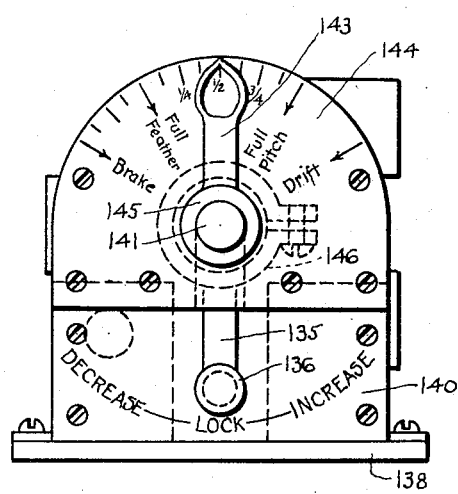
Figure 29:
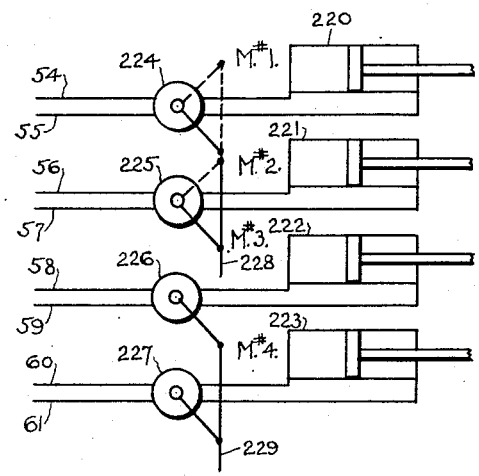

Figures 6, 7 and 8 being of double size as compared to Figures 1, 2, 3, 4 and 5;

Figure 9 shows an end elevation of one of the individual selector valves for one of the blade shifting devices; said valve being mounted into the selector valve assembly; and Figure 9 is a cross-section on the line 9—9 of Figure 13, looking in the direction of the arrows;

Figure 10 shows a plan view of one of the selector valve assemblies, removed from the base plate and from the other selector valves of the group;

Figures 11 and 12 are vertical cross-sections through one of the selector valves, being taken on the lines 11—11 and 12—12 of Figure 13, looking in the directions of the arrows; the rocking valve element being shown in its normal or "Lock" position;

Figure 13 shows a longitudinal horizontal section on the rock axis of the selector valve unit, only the end portions of said unit being shown, the central portion thereof being cut away to shorten the figure; and is a section on the lines 13—13 of Figures 9, 11 and 12, looking in the directions of the arrows;

Figure 14 shows a plan view of the complete selector-valve unit, for a four motored airplane, the valve handles and the actuating arms all being in their normal or "Lock" positions;

Figure 15 shows a side elevation corresponding to Figure 14, looking at the left hand side of the unit;

Figure 16 shows a side elevation corresponding to Figures 14 and 15, looking at the right hand side of the unit;

Figure 17 shows an end view corresponding to Figures 14, 15 and 16, looking at the front end of the selector unit;

Figure 18 shows an end view corresponding to Figures 14, 15, 16 and 17, looking at the back end of the selector unit;

Figures 14, 15, 16, 17 and 18 being on one-half the scale of Figures 9, 10, 11, 12 and 13;

Figure 19 shows an end elevation of the servo-valve for controlling delivery of operating fluid to and release of said fluid from, the servo-unit; the operating handle being in its central or "Lock" position, and the indicator being in its central or ½ pitch position, showing that the blades of all propellers are at that position, assuming that all the selector valves are in gang connection;

Figure 20 shows a fragmentary side elevation corresponding to Figure 19, and looking at the left hand side of the selector-valve element;

Figure 21 shows a plan view corresponding to Figures 19 and 20;

Figure 22 shows a horizontal section through the servo-valve assembly, being a section on the lines 22—22 of Figures 19, 20 and 23, looking in the directions of the arrows;

Figure 23 shows a vertical cross-section on the lines 23—23 of Figures 20, 21 and 22, looking in the directions of the arrows, the rock valve being in its central or "Lock" position;

Figure 24 shows a schematic diagram or layout of the several units, together with the oil or fluid connections between them; and it also shows schematically a simple form of electrical control for actuating the servo-valve according to total power being delivered by the several power-motors being served, for blade pitch control thereof, automatically, if desired;

Figure 25 shows schematically a flow sheet for actuating influences through the arrangement herein disclosed, one, only, of the blade shifting devices being shown as connected into thte flow, for purposes of simplicity;

Figure 26 shows a modified cross-section on the line 26—26 of Figure 8, looking in the direction of the arrows, and shows the use of channel shaped guides for holding and guiding the rock bars in their vertical movements in place of the rectangular tubes elsewhere illustrated;

Figure 27 shows schematically one of the blade shifting cylinders with indications adjacent thereto for movements of the blade shifting devices to a reversing position for reversing the propeller blades and also to a position beyond the "Full pitch" position for airplane operation under such conditions as a "Dead engine" with a minimum amount of drag due to the propeller blades;

Figure 28 shows a face view of a modified form of scroll plate and indicating finger in place of that shown in Figure 19, for use in connection with an arrangement for making possible the reversing of the blades, and also to make possible the shift of the blades to the "Dead" position; and Figure 29 shows schematically a layout including four blade shifting devices, together with suitable reversing valves in the lines which lead to them, and with gang control for two sets of said reversing valves, so that one or the other set of such valves may be reversed to cause reversing operation of the blade-shifting devices in a special case. For example, such arrangement might be used in case it were decided for a special reason to reverse the blade shifting actions at one side of the medial line of an airplane as compared to the blade shiftings at the other side of such medial line, in order to execute very rapid maneuvers of the airplane.

I will first mention that in the arrangement of Figure 24 the blade shifting device of each variable pitch propeller is provided with a suitable form of cylinder and plunger arrangement, generally in or adjacent to the hub of such propeller, together with suitable oil line or lines to said cylinder and/or plunger, so that oil or other fluid under pressure may be delivered to and released from the same according to the blade shifting operations to be effected by the pilot or other officer or by other means of control. I do not herein concern myself particularly with the exact form of these blade shifting devices, as such, beyond the fact that they must be supplied with and relieved of, such oil or other fluid to effect their functionings. In the schematic layout of Figures 24 and 25 I have shown four power motors, 30, 31, 32 and 33, respectively, delivering power over the shafts 34, 35, 36 and 37, respectively, to the several propellers 38, 39, 40 and 41, each of which propellers is provided with variable pitch blades. The blade shifting cylinders for these propellers are shown at 42, 43, 44 and 45, respectively; and in the particular arrangement shown each of these cylinders is provided with a plunger, same being shown at 46, 47, 48 and 49, respectively. Suitable connections are schematically shown at 50, 51, 52 and 53 from these plungers to the hubs of the respective propellers, for ensuring actuation of the blade pitch controls according to the positions of said plungers. Also, I have shown the fluid lines 54—55, 56—57, 58—59 and 60—61, to the opposite ends of the several cylinders, for supply of oil or other pressure fluid to and from the opposite ends of said plungers as required for the blade shifting functions.

Heretofore it has been customary to provide valves for control of delivery of oil to and from these lines 54 to 61, inclusive, said valves being in suitable connection with a source of pressure oil, and with a suitable return or receiving receptacle; and it is evident that mere shifting of such valves, even if performed in gang operation will not necessarily result in equal or even approximately equal blade shifting operations. This is true because the blade shifting devices may not and probably will not operate at equal rates, due to greater or less friction in the several devices, presence of ice or other obstructions on some of the devices to a greater extent than on others; and other causes, such as greater fluidity of the oil reaching some of the devices than reaching others due, for example to different temperature conditions, etc. One principal object of my present invention is to overcome and remedy this objection to any such devices and operations.

Referring to Figures 1 to 8, inclusive, I have therein shown a servo-unit including a base section 62ª wherein are provided a set of oil or fluid cylinders corresponding to each of the blade shifting devices to be actuated and controlled. These are the small cylinders 62, 63, 64, 65, 66, 67, 68 and 69, placed in two rows along the opposite sides of the base section, all said cylinders being conveniently placed in vertical formation. Thus there are two of these small cylinders in opposition to each other, for each of the blade shifting devices to be served. In the arrangement shown these small cylinders serve blade shifting cylinders and plungers as follows: 62—63 serve 42—46; 64—65 serve 43—47; 66—67 serve 44—48; and 68—69 serve 45—49. Manifestly, in the case of a greater number of blade shifting devices (or a smaller number thereof) the number of pairs of these small cylinders would be modified accordingly. Plungers 70, 71, 72, 73, 74, 75, 76 and 77 work in fluid tight fashion in these small cylinders, said plungers being provided with oil rings such as 78, if desired. Suitable oil connections 79, 80, 81, 82, 83, 84, 85 and 86 are provided in the base section in communication with the lower ends of these small cylinders, and for proper flow of oil or other fluid thereto and therefrom. These connections correspond to the lines 54—55, 56—57, 58—59 and 60—61 already referred to; and I provide suitable valving connections between these lines and connections, as will presently appear.

In the base section, and preferably centrally thereof in a longitudinal direction are the larger or power cylinders 87 and 88. These are also placed in opposition to each other; and they serve the two groups of small cylinders as will presently appear. Since the device herein illustrated is for a four motored airplane, and has the groups of small cylinders, four each, I prefer to make each of the larger or power cylinders 87 and 88 of double the diameter of the small cylinders which it is intended to serve, thus giving to each of these power cylinders a cross-sectional area equal to the combined areas of all four of the small cylinders which it is intended to serve. Also, this arrangement will ensure a total displacement within each power cylinder equal to the combined displacements of all its small cylinders, for the same plunger movement of power and small cylinder plungers. The plungers in the power cylinders are shown at 89 and 90, and they work vertically therein as will be readily apparent. The base section is provided with suitable passages 91 and 92 reaching to the lower ends of these power cylinders, and providing for flow of oil or other fluid back and forth to said power cylinders under suitable control, as will be hereinafter described.

I provide interconnections between the power cylinder plungers and the plungers in the small cylinders. For this purpose each small plunger is provided with an upstanding rack bar 93, and each of the power plungers is provided with an upstanding rack bar 94. Along the structure, and above the several cylinders, there is mounted a horizontal rock shaft 95. This rock shaft is suitably journalled in ball or other anti-friction bearings 96, 97, 98 and 99 carried by the upper portion of the base section, and so formed and mounted that they do not interfere with vertical movements of the several plungers for the full strokes necessary thereof. This rock shaft carries a gear element 105 joining opposite rack bars of the various plungers, there being five such gear elements shown. One gear element joins together the rack bars of the two power plungers, and one gear element joins together the rack bars of the two small plungers for each of the blade shifting device services, as will be readily seen.

Manifestly, as the plungers along one side of the base section move up, those along the other side of said base section must move down in equal amounts, so that oscillations of the one set must always be accompanied by equal and opposite oscillations of the other set. Furthermore, full strokes of the power plungers are performed in either direction, up or down, with always exactly proportionate movements of all of the small plungers.

Now I have provided power oil or fluid supply for the power cylinders, admitting and releasing same to and from the passages 91 and 92 under control of the pilot. It will be evident that whenever pressure oil is admitted through the passage 91 to the power cylinder 87, for example, the plunger 89 thereof will be forced up, thereby rocking the shaft 95; and simultaneously the small plungers along the opposite side of the base section will be forced down, displacing oil or other fluid to their respective blade shifting devices. Furthermore, it will be noted that during this operation the power plunger 90 will be forced down, and, with suitable connections to permit release flow of oil or fluid through the connection 92, this operation will not be obstructed. Furthermore, during this operation the small plungers along that side of the base section at which the power cylinder 87 is located will move up, permitting in-flow of oil or operating fluid into their small cylinders, thereby providing for release and return thereof from the proper portions of the several blade shifting devices. Contrary actions would occur in case of admission of pressure oil or fluid to the power cylinder 88, through the passage 92, etc.

It is thus evident that merely by controlling the admission of power oil or fluid to the large or power cylinders (and release of such oil from the opposing cylinder), I have provided means to simultaneously ensure equal displacements of oil or operating fluid for the several blade shifting devices simultaneously, and in "synchronism"; and that this result is ensured with an extremely simple arrangement, and always under complete control, merely by the admission and release of oil or fluid to or from the power cylinders.

Since the displacements of fluid effected by the small cylinders at one side or the other of the servo unit are equal for all said cylinders of that group it follows that the amounts of fluid driven to the several blade shifting cylinders 42, 43, 44 and 45 are all equal on the assumption that all of the blade shifting plungers 46, 47, 48 and 49 are of the same size, so the blade shifting actions effected for all the propellers are equal. Thus there is effected an equal shifting of the blades of all propellers by a single power operation under control of the pilot controlling delivery of fluid to the power cylinder alone. Such control is effected by a suitable valve arrangement as will presently appear.

Reference to Figure 8 in particular shows that the normal intended elevation of the oil or other fluid in the base section is substantially to the surface 100. The highest elevation of the plungers in the several cylinders is to the surface 101, as shown by the left hand plunger in Figure 8. Thus these plungers are normally submerged at all times in such fluid. Furthermore the elevation 100 is below the top surface 102 of the base section, and that top surface or parting line is also the rotative axis of the shaft 95. This being the case the outer races of the ball bearings, 103 can be set down into semi-bearings cut into the upper portion of the base section, and said bearings are then locked into place by suitable bearing retainers 104. The gears 105 which mesh with the rack bars are keyed to the shaft 95, and the lower portions of said gears work in the bath of oil or other fluid, so that lubrication is effectively maintained at all times. Some of this lubricant will be carried up and find its way onto the top surface, and thence to the several bearings, ensuring effective lubrication thereof. Still it will be seen by examination of Figure 8 that the oil level is low enough to make it unnecessary to seal the end bearings in order to prevent direct leakage of oil from the unit.

There is provided a cap or cover section 106 which is set down over the base section. This cap section rests on the top surface of the base section, to which it is suitably secured. Said cap section also has its ends formed to receive the bearing retainers for the end bearings; and suitable plates 107 and 108 may be secured over the end portions of said cap section at the positions of said end bearings. These plates therefore serve to seal the cap section at the bearing locations. However, if desired, a small diameter extension 109 may be secured to the end of the rock shaft 95 at one end, and carried through the plate 108 to the outside of the structure. It is noted that the extent of rock of the shaft back and forth is a direct measure of the displacement effected by the plungers, and therefore is a measure of the blade shifting effected at the propellers. I have therefore, in Figure 3, shown the finger 110 carried by this shaft extension, and working over the scale 111 on the plate 108. This scale may be graduated to show blade pitch in any suitable terms.

An oil level indicator 112 may be placed in the base section at a suitable point, to show the level of oil within the device and a suitable plug 113 may be placed in the upper portion of the cap section, which when removed permits introduction of additional liquid into the unit.

It is noted that the base section is formed with the depressed portion 114 centrally thereof, reaching to a level below the normal fluid surface within the base section, but not below the highest position of the power plungers during their travel. This depression ensures a uniformity of fluid level at both ends of the base section at all times.

In order to guide and support the rack bars during their vertical movements I have shown the rectangular tubes 115 reaching down from the roof of the top or cover section around the several rack bars to positions adjacent to the several gears 105. These tubes will effect their guiding and supporting actions for full rack bar movements. If desired the lower ends of these tubes may be slightly flared as shown in Figure 8 to assist in original assembly of the cap section into place.

I have provided a convenient valve for control of delivery and release of power fluid to and from the power cylinders 87 and 88. A suitable source of pressure fluid is provided, such as a chamber 116 (see Figure 24) wherein said fluid is contained under pressure; and in the scheme illustrated said fluid circulates through the system from time to time, there being also a return or low pressure chamber 117 to which said fluid returns, a suitable pump 118 taking the fluid from the return chamber 117 and delivering and storing it under pressure in the chamber 116.

The servo-valve is shown in Figures 19, 20, 21, 22 and 23. It includes the cylindrical casing 119 having at one side the two fluid connections 120 and 121 for pressure and return fluid lines, respectively; and having opposite thereto the two connections 122 and 123 lying in the same transverse plane as the pressure connection 120. Said valve also includes the rock plug 124 which works in sealing fashion within the cylindrical casing 119 as evident from the several figures. This rock plug includes the transverse passage 125 having the broad port 126 at its end in connection with the port 120 for pressure fluid, and the reduced port 127 at its opposite end. Normally said reduced port 127 stands in sealing position between the ports 122 and 123, and the plug also serves to seal both of said ports at such times, as shown in Figure 23. By rocking the plug in one direction or the other said reduced port 127 will be registered with either the port 122 or the port 123 as selected; and due to the enlarged end 126 supply of fluid under pressure will be ensured through said passage in either case. Thus pressure fluid will be delivered to either the port 122 or to the port 123 as determined by the direction of rock of the plug 124.

Said plug 124 also has the two transverse notches 128 and 129 at points between the ends 126 and 127 of the passage 125, said notches reaching across the plug, or axially thereof, as evident from Figures 22 and 23. There are blind spaces between these notches 128 and 129, and the reduced end portion 127 of the passage, so that as the rock plug stands in its central or normal position shown in Figure 23 both of the ports 122 and 123 are sealed as shown in Figure 23. This is the normal or "Lock" position of this servo-valve. These notches 128 and 129 reach to the ends of the body of the plug; and the discharge or return port 121 communicates with the space at one end of the plug, as shown in Figure 22. When the plug is rocked in one direction or the other sufficiently to bring the reduced end 127 of the passage 125 into communication with one or the other of the ports 122 and 123, to thereby deliver pressure fluid to such port, one or the other of the notches 128 and 129 will come into communication with the other of said ports 123 and 122, so that simultaneously with delivery of pressure fluid to one port, the other port is connected to the return or delivery port 121. This will be true for either direction of plug rock.

Preferably the body or casing of the servo-valve is in the form of a cup, as shown in Figure 22, a plate 130 being provided to close the open end thereof after the rock plug has been set into place. Also, preferably said rock plug is provided with the hollow shaft extensions 131 and 132, reaching through the ends of the device, and suitable packing glands 133 and 134 are provided therefor, as will be readily understood from Figure 22. To one end of this hollow shaft there is connected the crank 135 having the handle 136 whereby the valve plug may be rocked back and forth for servo-operations. A suitable housing 137 may be set over the valve structure, said valve structure being supported on a suitable base plate 138, as shown. This housing is formed with end slots in its end walls to permit setting it down over the valve assembly and onto the base plate; and these slots at the front end of the housing may be covered over by the scroll plates 139 and 140, as shown in Figures 19, 20 and 22.

Extending axially through the hollow shaft of the rock plug of this servo-valve is the shaft section 141. Said shaft section has its rear end connected by a section of flexible shafting 142 with the rock shaft 95 of the servo-unit, so that it rocks back and forth with the plunger movements and in proportion thereto, and therefore proportionately to the fluid displacements to and from the several blade shifting devices. I therefore provide a finger 143 on the front end of this shaft section 141, said finger reading in comparison to a scale 144 on the scroll plate 139, which scroll plate is suitably graduated to show blade pitches in any desired scale, such as percent of full pitch. It is noted that said finger 143 is carried by the collar 145 clamped to the projecting end of the shaft section 141. Also, that the crank 135 is carried by the collar 146 clamped to the projecting end portion of the hollow shaft. In order to accommodate these parts without interference I prefer to offset the crank 135 from the plane of the finger 143 as apparent from Figures 20 and 22, it being noted that due to the proportions of parts of the plunger movements, and gear sizes shown in Figures 8, etc., the rocking of the shaft 95 does not exceed about 122 degrees in its extreme movements. Also, that the crank 135 does not rock more than about 90 degrees from one extreme to the other.

There are the pressure fluid and return lines 147 and 148 (see Fig. 24) in connection with the pressure and return chambers 116 and 117, respectively. Lines 149 and 150 connect from these lines to the ports 120 and 121 of the servo-valve, as shown in Figure 24. Lines 151 and 152 connect from the ports 122 and 123 of the servo-valve to the power cylinder passages 91 and 92. Thus, by rocking the crank 135 in one direction or the other pressure fluid will be delivered to one or the other of said power cylinders for actuation of the plungers for delivery of pressure fluid to the respective blade shifting devices, etc. Conveniently the several parts are so connected up that as the crank 135 is rocked in the "Increase" direction shown in Figure 19, the servo-unit will rock its shaft in such direction that the finger 143 will move over towards the so rocked crank position. In other words, the scale of the scroll plates are marked for reading at one or the other side of the vertical as the case may be, for increases or decreases of blade pitches.

With this arrangement, rocking of the crank 135 towards the right will result in delivery of power to the servo-unit in such manner that the blade shift will be in the increase direction, the finger 143 moving over its scale in the increasing direction while said crank is held in such rocked position. As the finger comes to the pitch position desired, for example, ¾, the crank will be moved back to its central or downwardly vertical position, where the "Lock" condition exists, whereupon the ports of the servo-valve will be sealed, and the power and other cylinders will be retained in the exact position thus established by fluid or hydraulic lock, and until a further rock of the crank 135 is effected. To again reduce the blade pitches it is only necessary to rock the crank 135 in the other direction, or towards the left or "Decrease" direction, whereupon pressure fluid will be delivered to the proper power cylinder, and fluid will be released from the other power cylinder to cause actuation of the blade shifting devices for reduction of blade pitch; and when the pitch has been reduced to the desired point, as shown by the position of the finger 143, the crank 135 will be again dropped or moved to its lower and central position, where the "Lock" condition will again exist. The simplicity of these manual or other control operations to secure desired pitch controls to known and pre-determined positions will now be apparent.

It has been assumed at all times in the previous discussion that the small cylinders of the servo-unit are connected to the proper blade shifting cylinders 42, 43, 44 and 45, and to the proper ends thereof, for proper actuation of the plungers 46, 47, 48 and 49 of said blade shifting cylinders. Such connections could be made directly from the several small cylinders but I have, in the present disclosures, made provision for selecting the operations of the several blade shifting devices, so that each of them may be operated either alone, and as an indivdual unit, or may be completely cut out of service, as for example, in case of disablement of the corresponding power motor or blade shifting device by enemy fire, or otherwise; or all these blade shifting devices may be operated in gang, or any selected ones of them may be ganged together, the others being cut out of service, or treated individually, as desired. I shall now disclose such arrangements, for which purpose reference will be had to Figures 9 to 18, inclusive, which show in full detail the "Selector-valve" unit.

This "Selector-valve" unit includes a valve structure 153 for each blade shifting device or propeller to be controlled. In the arrangement illustrated there are four of these valves, one for each of four propellers and blade shifting devices. Each of these valve elements includes a casing 154 of cup shape, wherein is rockingly mounted a valve plug 155. Said valve plug has the two transversely extending passages 156 and 157 located in adjacent transverse planes; and there are the ports 158 and 159 formed in the casing at one side thereof, and at these planes of said passages 156 and 157, respectively. These ports 158 and 159 are connected directly to the lines connecting to the ends of the blade shifting cylinder to be controlled, being the lines 54—55, or 56—57, or 58—59 or 60—61, as the case may be. In Figure 24 the various ports of the valve units are designated by the same numerals as are used in the detailed illustrations and descriptions of said valve units; but since there are provided four sets of the valve units (corresponding to the four propeller blade shifting units, 42, 43, 44 and 45), I have used the suffixes "a," "b," "c" and "d" in connection with the numerals applied (in Fig. 24) to the valve units which correspond to said propeller blade shifting units, respectively.

The casing 154 also includes the ports 160 and 161 located in the transverse planes already referred to, said ports 160 and 161 being substantially at right angles to the locations of the ports 158 and 159. Said ports 160 and 161 are connected directly to the proper small cylinders of the servo-unit, that is, to the passages 79—80, or 81—82, or 83—84, or 85—86, as the case may be (see Fig. 24). These ports therefore establish connections between the small servo-unit cylinders and the respective selector-valves.

The casing 154 also includes the ports 162 and 163 in the plane which includes the port 158, and substantially opposite to the said port 158; and also includes the ports 164 and 165 in the plane which includes the port 159, and substantially opposite to the said port 159. There are blind spaces between the pairs of ports 162—163 and 164—165, respectively. The ends of the passages 156 and 157 close to the ports 162—163 and 164—165, respectively, are of port size, as shown at 166 and 167; but the opposite ends of said passages, close to the ports 158 and 159 are widened out as shown at 168 and 169, respectively. With this arrangement, each of the passages 156 or 157 retains communication with the corresponding port 158 or 159 during full rock of the valve plug 155.

Said valve plug is also provided with an axially extending notch 170 which spans both of the ports 160 and 161, and is of sufficient arcuate dimension to maintain connection with said ports during rock of the valve plug to bring the passage ends 166 and 167 into communication with either of the ports 162—163 or 164—165.

The ports 162—163 and 164—165 are connected to the oil or fluid pressure line and the return line, 147 and 148, in opposition, as shown in Figure 24. In other words, in the plane of Figure 12 one of the ports 162—163 is connected to the pressure line, and the other of said ports is connected to the return line; and in the plane of Figure 11 the ports 164—165 are connected in opposition to said pressure and return lines. Consequently, by rocking the valve plug downwardly from the positions of Figures 11 and 12 to bring the ends 166 and 167 of the passages 156 and 157 into engagement with the ports 162 and 164, the ports 158 and 159 (and therefore the ends of the corresponding blade shifting cylinder) will be connected to the pressure and return lines in one manner; whereas by rocking the valve plug upwardly to bring the ends 166 and 167 into engagement with the ports 163 and 165, the ports 158 and 159 (and the ends of the blade shifting cylinder) will be connected to the pressure and return lines, but in opposition to the connections made when the valve plug is rocked downwardly (see Fig. 24). Furthermore, when the valve plug stands in the position of Figures 11 and 12, the ends of the passages 156 and 157 are sealed against the blind spaces of the valve casing; and thus under these conditions the blade shifting plungers in the cylinders 42, 43, 44 and 45, respectively, are fluid or liquid locked, to hold the blades in locked pitch condition.

By rocking the valve plug to bring the ends of the passages 156 and 157 into engagement with the ports 160 and 161, respectively, it will be seen that the ends of the blade shifting cylinders will be connected to the respective small cylinders of the servo-unit; so that under these conditions the blade shifting operations will be accomplished by use of the servo-unit, and not by direct application of pressure (and release) from the chambers 116 and 117. In other words, this last mentioned position of the valve plug is the servo position, for servo operation.

Now it was mentioned that there is one of these valves for each of the blade shifting devices, and corresponding to each pair of small cylinders of the servo-unit. These several valves may be operated either in full gang, or in any selected gang relationship, or independently, as desired. Whenever the full gang operation is in effect it will be seen that all of the small cylinders of the servo-unit are connected directly to their respective ends of the blade shifting cylinders; but in case one or more of these valves should not be connected into the gang relationship, but operated independently of the others, and therefore with its plug in some position other than that shown in Figures 11 and 12, it will be evident that the small cylinders of the servo-unit corresponding to such valve will not be connected to their blade shifting cylinder, but will be sealed by the servo-unit. Under such conditions these small cylinders of the servo-unit would be oil or fluid locked, and they would prevent any operation of the servo-unit as long as this condition existed. It will be noted, however, that whenever the valve plug of the selector-valve stands in either the central "Locked" position of Figures 11 and 12, or in either of the manual operating positions where the passages 156 and 157 are connected to the ports 162—164, or 163—165, the notch 170 serves to connect the corresponding small cylinders directly together, or short circuit them (see Fig. 24), so that whenever the selector-valve is in a manual operating position the corresponding servo-unit cylinders are cut out, and do not interfere with proper functioning of the servo-unit. The notch 170 therefore performs a very important function.

The selector-valve unit has its plug provided with the central passage or is hollow, as shown at 171, and the ends of this hollow shaft portion reach outside of the casing. Said casing is of generally cup-shape, and its open end is sealed by the end plate 172. Suitable packing glands 173 and 174 are provided for sealing the shaft portion of this plug in fluidtight fashion in well understood manner.

It will be remembered that there are selector valves for all the blade shifting cylinders and for all the pairs of small cylinders of the servo-unit. I prefer to mount all these selector valves in alignment axially with each other on the base plate 175, as is evident from Figures 9 to 18. I then extend a gang shaft 176 through all the hollow valve shafts, and provide selective connections between the several valve plugs and this gang shaft as will now be explained. At its rear end each of the valve hollow shafts is provided with an arm 177 (see Figs. 9, 10, 13, 14, 15 and 16) whose inner end is split and clamped to the extending end portion of such hollow shaft; and the outer end of such arm is provided with an operating handle 178 having the threaded stem 179 which threads through the outer end portion of the valve arm 177. Said handle may therefore serve to rock the hollow shaft, and therefore the valve plug; and furthermore, by threading said handle inwardly its inner end may be projected beyond the face of the arm 177 a greater distance than that shown in Figure 10, for example.

Secured to the rock shaft 176 adjacent to each of the arms 177 is an arm 180, having in its outer end the opening 181 which may receive the end portion of the stem 179 when said stem is threaded outwardly by threading rotation of the handle (see Figs. 10, 13, 14, 15 and 16). It is thus evident that merely by threading the handle in or out on its own stem 179 it may be either freed from the arm 180 of the gang rock shaft, or connected to said arm in operative manner. The inner end portion of said arm 180 is split and clamped to the gang rock shaft as evident from Figure 9.

The front end of the gang rock shaft 176 is provided with a gang control crank arm 182 having its handle 183 on its outer end (see Figs. 13, 14, 15, 16 and 17), so by rocking this handle the gang rock shaft is rocked and brought into desired operative position, thereby also bringing the valve plugs of the several selector valve units which are locked to said gang shaft into corresponding positions. By this means it is evident that any one or more of the several selector valves may be locked to the gang shaft and therefore to the gang handle 183 as may be desired, leaving the other selector valves free for manual operation independently of each other and of the gang operation. Any grouping of the selector valves may thus be effected in very simple manner, and very rapidly.

Examination of Figures 9, 11, 12 and 13 shows that there is a small clearance between the gang shaft and the hollow plug of each selector valve. Furthermore, said gang shaft is supported or journalled by short rings 184 and 185 within the outer end portions of the end selector valves. These journalling rings may be of metal or rubber, since they merely serve to freely support the gang shaft, and permit free rocking thereof independently of the valve plugs. It is noted that the clearance between said gang shaft and the plugs makes it unnecessary to obtain exact alignment of the various selector valves on the base plate, thereby reducing costs and difficulties of manufacture, etc.

A suitable housing of sheet metal, 186 is set down over the several selector valves, and secured to the base plate, as shown. This housing is provided with suitable openings to accommodate the various port groups, and also to pass the various arms 177, 180, and 182, etc. The front and back ends of this housing may be closed.

There are four principal positions of each of these selector valve plugs, namely, the "Lock" position between the ports 162—164 and 163—165; the "Increase" position; the "Decrease" position; and the "Servo" position. Suitable markings may be placed on the housing to designate these positions for the several valves, and also to designate these positions for the gang operating handle, as shown. In this connection it is preferable that in connecting up the selector valve to the servo-unit and to the various blade shifting cylinders the "Decrease" position should come adjacent to the "Servo" position as shown. This is so that in passing from manual operation of any given propeller to the "servo" operation, the blades of such propeller will first be brought into the reduced pitch condition.

Reference may now be had to Figure 7 in which I have shown a fragmentary section through the upper portion of one of the small cylinder walls and the plunger therein at its fully elevated position. It is noted that the cylinder wall has the notch 187 cut down to a position sufficiently low so that as the plunger reaches its fully raised position it rides slightly above this notch, thereby permitting direct communication between the cylinder space beneath the plunger and the oil or fluid bath ouside of the cylinder. As soon as the plunger again moves down slightly it will seal this notch and cut off such communication, and further depression of the plunger will force the oil or fluid to move to the blade shifting cylinder. In other words, this notch does not interfere with normal blade pitch shifting operations, but does permit momentary or short stroke communications between the cylinder interior and the oil or fluid bath. This is a "compensating" arrangement. It serves the following useful function: during various blade shifting and other operations in which pressures are developed against the various plungers it is evident that slight leakages may and probably will occur. These in time might be sufficient to throw the various blade shifting plungers out of harmony between themselves, and/or between the respective plungers of the servo-unit. However, each time the servo-unit is operated to the full stroke position in either direction, to thereby carry one or the other set of small plungers to the fully raised position, all said plungers will be exposed for a very short stroke to the oil or fluid bath, thereby permitting inflow of a small amount of such oil or fluid to compensate for any such previous leakage, and thereby maintaining the system at all times fully operating, and completely filled with the oil or fluid.

In connection with the foregoing it is also noted that changes of temperature will cause expansions or contractions of the oil or fluid locked into the system. It is desirable to use an oil or fluid whose temperature coefficient of expansion is low, or zero, and which fluid has a very low freezing or stiffening point. Still, the compensating feature just above explained will ensure suitable transfers of such oil or fluid into or out of the several small cylinders to prevent any excessive conditions occurring in case of large changes of temperature and the like.

It is further noted that in some cases the plunger area on one side of each blade shifting plunger may be slightly different from that on the other side thereof, due to the presence of the plunger rod or piston rod. It is evident that, since each of the small cylinders of the servo-unit is individual to one side or the other of a given blade shifting plunger this difference of blade shifting plunger area may be compensated for by slight differences of the diameters of the small cylinders along one side of the servo-unit as compared to the other side thereof.

It is noted that when all of the selector valves are in their "servo" positions all of the blade shifting devices are being operated by the small plungers within the small cylinders of the servo-unit. Under these conditions the accumulated resistances of all these plungers must be overcome by the force of the single large plunger then in operation. If all these resistances are equal the fluid pressures within the several blade shifting systems will be equal. However, in case any one of these blade shifting devices should "stall" or find excessive resistance due to any cause, it would automatically take from the servo-unit a greater proportion of force than would go to the others, and in an extreme case the full displacement force of the large plunger might be exerted on a single small plunger, thereby building up pressures equal to four times the available pressure against the large plunger, in pounds per square inch. Such excessive pressure might serve to overcome the resistance encountered, permitting the servo-unit to continue to function and shift the blades of all the propellers.

Due to the foregoing condition it may sometimes be found desirable to provide cross-connections such as 188 (see Figure 24) between the lines connecting to the two ends of each blade shifting cylinder, with a relief valve 189 in each of said lines, permitting by-passing of fluid when the pressure exceeds, say three times the normal expected maximum. Thereby there will be assurance that under no conditions will the functioning of the servo-unit be prevented by existence of such an abnormal condition as that just referred to. Such by-passing valve should function to permit by-pass flow of fluid in either direction under excessive pressure conditions such as just explained, but will otherwise remain closed and prevent by-passing for normal operations.

It is to be noted that under some conditions one or more of the blade shifting devices might get out of step or synchronism from the others. This might happen for example in the case just above explained. In any such case it is only necessary to shift the servo-unit to a full position in one direction or the other, whereupon the compensating notches 187 will permit equalization of volumes of oil or fluid to occur.

Whenever one or the other of the blade shifting devices has been under "manual" control by reason of its valve handle 178 being disconnected from the gang rock shaft, it is evident that the blade shifting device so manually operated will probably be out of harmony or synchronism with the others which have remained under servo operation, so that if such handle 178 should, under these conditions be connected back into gang operation its blade shifting devices would be out of step. In order to meet such a condition the following procedure is proper; When any given blade shifting device is to be brought into gang control its handle 178 should be thrown full over to the "Increase" position (intermediate between the "Lock" and "Servo" positions) and left a short interval to permit the blades to come to the full feathering condition. Also, the "Servo-valve" should be thrown over the "Increase" position until the indicator finger 143 shows the "Full Feathering" position for the servo-unit. Thereupon the selector valve of such particular blade shifting device may be thrown over to the "Servo" position (see Figure 17), and locked to the gang operating shaft, said shaft and the gang operating handle 182 having, of course, been previously moved over to, or being in, the gang or "Servo" position. Thereafter normal "Servo" operations may be carried on.

It is to be noted that the "selector valve" unit serves to control delivery and return of oil or fluid to and from the various blade shifting devices, whether the "Servo-unit" is being used or not. When said "Servo-unit" is being used the flow of oil or fluid to and from the several blade shifting devices is nevertheless through the "Selector valve"; and when said "Servo-unit" is not in use the oil or fluid flows directly between the chambers 116 and 117, and the respective blade shifting cylinders, but through the several servo valves and under their control. Such facts are emphasized by examination of Figure 25.

In my co-pending application, Serial No. 459,336 (now Patent No. 2,612,956, issued October 7, 1952) I have disclosed, in connection with multi-motored airplanes and the like installations, means for measuring the rate of delivery of fuel delivered to each of the several motors of the group, such rate of fuel delivery being a measure of power together with means to synchronize the powers being delivered by the several motors of such group, and other functions. There may arise conditions under which it is desired to measure the power of all the motors (or some of them) as a group, instead of individually, together with means to automatically control other functions based on such total power. For example, in the present instance it may be desired to control the blade pitches of the several propellers as a group in comparison to the total power being delivered by such group; and this might be especially desirable in the present case wherein I have provided means to ensure that the pitches of the blades of all propellers shall be equalized, so that there is assurance that all said propellers are taking the same "bite" on the atmosphere. Accordingly I have made provision herein for securing such result.

Reference to Figure 24 shows the presence of a fuel supply line 190, serving to deliver fuel to all the power motors through individual connections 191, 192, 193 and 194 to said motors; and in said figure I have also shown the fuel metering device 195 placed in said line 190 in advance of the motor connections, said metering device including a shaft 197 which rotates or moves in proportion to the fuel metered through said device 195 so that the rotations of said shaft are a measure or indication of the fuel delivered through said device 195. Therefore said meter serves to measure the total fuel delivered to all the motors. Meters of this type are well known in the arts so it is not necessary to illustrate or describe the metering device 195 in greater detail herein. Such metering devices are of conventional form. Fuel is supplied to said metering device through the supply connection 196 from a suitable source, such as a fuel pump, not shown. I have disclosed in my said co-pending application and issued Patent No. 2,612,956 that the rate of meter rotation will constitute a measure of the power being delivered by the motor (or motors) being supplied thereby; so it is evident that the rate of rotation of the meter shaft 197 in the present case will be a measure of the total power being delivered by all the power motors 30, 31, 32 and 33. This meter shaft serves to drive a speed responsive device of any suitable form, such as the governor 198 (shown by way of illustration only), through the medium of the connection 199. Said governor has the sleeve 200 which rises and falls with change of governor speed; and said sleeve carries the contact 201. Said contact 201 will engage the stationary contacts 202 and 203 according to increase and reduction of speed, for governing purposes. The tension spring 203ª resists movement of the sleeve 200 so by adjusting the tension of said spring in well known manner the "setting" of the governor may be varied from time to time to ensure automatic maintenance of any pre-selected speed, and therefore of any pre-selected power, since the speed of the governor is dependent on the rate of meter operation of the meter 195. The tension of the spring 203ª may be adjusted in any conventional manner, as by turning the knurled knob 203ᵇ on the stem 203ᶜ which is threaded through the stationary part 203ᵈ.

In this scheme I have shown the solenoids 204 and 205 mounted on or adjacent to the "servo-valve"; and said solenoids act on their armatures 206 and 207 which are connected to the arm 135 of said "servo-valve" in opposition by the links 208 and 209. Springs 210 and 211 normally hold the arm in its central or "Lock" position. Suitable electrical connections 212 and 213 connect one end of each of said solenoids to one of the contacts 202 and 203; the other ends of the solenoids are joined together by the connection 214; a suitable source of current is provided such as the battery 215; and connections 216 and 217 connect the terminals of this battery to the speed governed contact 201 and to the common connection 214, respectively.

With this arrangement it is evident that increase of total power, represented by increase of meter speed, will result in shift of the arm 135 in one direction, whereas reduction of total power will result in shift of said arm in the other direction. Thus it is possible to cause automatic shifting of the propeller blade shifting devices to continuously adjust the pitches of the blades and thereby restore the total power being absorbed by all the propellers to the total amount which is desired; and at the same time it will be seen that the pitches of blades of all propellers will be held to the same degree, that is, equalized, due to the presence of the structures herein elsewhere disclosed. Furthermore, this scheme does not prevent manual control at any time, as opening of the switch 218 in the circuit will throw the automatic power control out of operation.

It is to be noted that the use of the closed fluid or oil or other liquid system will ensure oil lock of the blade shifting devices when the control valves are in sealing positions, so that no unintentional change of blade pitch can occur.

Manifestly, if desired suitable pressure gauges such as 219 may be connected to the several lines leading to the ends of the blade shifting cylinders, to indicate pressures existing therein; such gauges being located at positions convenient for observation by the pilot or engineer.

Evidently the several units herein disclosed, including the servo-unit, the servo-valve, the selector-valve, and others, may be located at convenient positions in the plane or ship, and readily interconnected, since the connections are in the form of oil tubes readily installed and connected to the proper ports and terminals of the units. Furthermore, it will be evident that the desired locking and exact responding actions of the several blade shifting devices are secured without the need of any mechanically movable connections or electrical connections between said devices and other control devices, since the oil or other liquid not only serves to produce the desired operations, but also to establish the desired locking actions.

In the form of servo-unit herein illustrated it will be seen that the operations of the small plungers which serve the several blade shifting devices are performed by fluid pressures exerted against the larger or power plungers. The transfers of power are effected by rockings of the shaft 95. Manifestly, if desired any other suitable power converting arrangement might be used, as for example, an electrical motor geared to the shaft 95 and serving to rock the same back and forth under pilot or engineer control.

Examination of Figures 1, 3, 4, 5 and 6 shows that the top surface of the servo-unit base section is flat, lying in the parting plane of the several bearings for the rock shaft 95. Such being the case said base section is readily machined and finished by simple shop operations and at low manufacturing cost.

Evidently any number of propellers may be controlled by installations embodying the herein disclosed features; and I have herein disclosed and described a four motored installation merely by way of illustration.

While I have herein disclosed a particular installation in which the present features are used for control of blade pitches of multi-motored airplanes, it will be evident that said features might also be advantageously used in connection with control of pitches of propellers of other ships, such as water borne craft. Therefore I do not intend to limit myself to air borne craft, except as I may do so in the claims to follow. Furthermore, certain or all of said features might be advantageously used in connection with the simultaneous control of turrets of warplanes, warships, and other installations in which such simultaneous control of turret turning might be desired. For example, in the case of a warplane having a number of gun turrets some or all of the present features might find advantageous use in connection with the simultaneous turning and control of all or some of said turrets from a common point, as from the location of a master gunner. Such control might be for rotation about a vertical axis, to control direction of fire; or it might be for control of angle of fire with respect to the horizontal; and in either case use of certain or all of the present features would make possible gang control of all or selected ones of such turrets. I contemplate and intend to cover all such installations and uses, as well as many others.

It will be evident that the blade shifting devices may serve to effect blade pitch change between two extremes of movement; and that the present disclosures make possible controls from and between said extreme limits or any intermediate positions. In some cases it will be found desirable to make provision for sometimes either fully or partially reversing pitch angles of one or more of the propellers to thereby exert a braking action by such propeller or propellers. If the blade shifting devices are so connected to their respective propeller blades that movement to one of the extremes will serve to cause reversing of pitch to a desired maximum angle, it will be evident that the "Full feathering" position will be encountered before reaching such maximum shift position. In Figure 27 I have shown a single blade pitch shifting cylinder 219 with its plunger; and have indicated adjacent thereto the positions of "Full pitch"; "Full-feathering"; and "Full reverse" (or "Brake"). Normally the adjustments will be effected between "Full pitch" and "Full-feathering" but when it is desired to effect reverse the movement will be carried (in Figure 27) to the left of the "Full-feathering" position. In Figure 28 I have shown a modified view similar to that of Figure 19, but in Figure 28 I have shown the pointer of finger 143ª as working over the scale 144ª having thereon the markings suitable for use in connection with such reversing arrangement.

Sometimes it may be desired to treat one set of propellers in opposition to another set, causing pitch controls of the two sets to occur in opposition to each other. For example, it might be desired to treat the propellers on one side of the medial line of an airplane as one group and to treat those on the other side of said medial line as another group; and in such case it might be sometimes desirable to either increase the pitch of one group without such increase of pitch of the other group, or at a different rate, or even in opposition thereto. This might happen, for example, in the case of a very rapid turning or maneuvering operation, where it was desired to exert more of a pull on one side of the plane than on the other, or even to push back on one side to aggravate the turning rate.

It will be seen that by use of my features any of these results may be readily secured; as it might be possible to provide two servo-units for the two groups of propellers and their blade control devices, together with corresponding servo-valves, etc; and to provide interconnections between these devices so that they could be themselves operated either individually or in gang connection.

Still, in Figure 29 I have shown a modified arrangement in which there are provided four of the blade shifting cylinders, 220, 221, 222 and 223, together with their plungers and liquid connections; and in said liquid connections I have provided the valves 224, 225, 226 and 227, whereby the connections between the small cylinders of the servo-unit and the ends of the blade shifting cylinders may be reversed; and said valves are connected in two groups, corresponding to the propellers at the two sides of the medial line of the airplane. By control of these two groups of valves the blade shifting devices at both sides of the medial line of the plane may be actuated either in the same direction (for normal operation) or in opposite directions (for special maneuvers). These valve gang connections are shown in Figure 29 at 228 and 229, respectively. This feature of special control of the blades of the propellers at the two sides of the medial line of the ship might be of especial use in connection with control of propellers for water borne craft.

The use of double or tandem propellers is known, that is, propellers in which there are two sections placed on the same axis of rotation, one in front of the other, and with means to drive said sections in opposite directions. It will be evident that my present features might be found of advantage in connection with such forms of propellers, since it would be possible to provide for the shifting of the pitches of both sections either independently or in gang, and to different degrees according to the relative effects desired from said two sections. I contemplate such applications and uses of my invention.

In Figure 26 I have shown a modified fragmentary section on the line 26—26 of Figure 8, looking in the direction of the arrows. In this case I have replaced the tubes 115 which guide the vertical rack bars with channel sections such as 230, and have brought the wall of the cap or cover section 106 close to the rack bars, so that said channel sections may be laterally supported by such wall. In this connection it is to be noted that the pressures exerted by the gears on the several rack bars tend to shift said rack bars outwardly, and this modified arrangement is admirably adapted to meet this condition.

It is noted that I have herein disclosed means to vary and to control variation of the "pitches" of the blades of a plurality of propellers simultaneously; and in certain of the disclosures heretofore described herein such variation of the pitches of these several propeller blades must of necessity occur in such manner that said pitches for the several propellers are always the same. Thus, when using a control unit such as that of Figures 1 to 8 inclusive, supplying the servo-motor cylinders of a plurality of propellers, the back and forth movements of the servomotor plungers will always be such that all these propellers will have at all times the same pitch settings; and furthermore said pitch settings will be always locked at the desired and pre-determined settings. An application of this scheme is shown schematically in Figure 24, already described. In other words, in the scheme of Figure 24 there is assurance that all the propellers will have at all times the same pitches, under control of the pilot or other operator.

In order to ensure completeness of synchronizations I have in Figure 24 also shown schematically means to synchronize the several power-motors driving the propellers 38, 39, 40 and 41, for speed. To this end I have therein shown schematically the speed control and synchronizing unit 380 in Figure 24, same controlling the throttles 381, 382, 383 and 384 of the several power-motors 30, 31, 32 and 33 which drive said propellers; these throttles being synchronously controlled from the unit 380 through the lines 386, 387, 388, 389 and 390, in any suitable speed synchronizing scheme. For example, such speed synchronization and control of these throttles of these power-motors may be effected by such devices and arrangements as are fully disclosed in my co-pending application for Letters Patent of the United States on Improvements in Synchronizing and Controlling Speed, Power, and Other Functions of Multi-Motored Airplanes, and the Like, Serial No. 459,336, filed September 22, 1942 (now Patent No. 2,612,956, issued October 7, 1952).

It is therefore evident that I have herein disclosed means to effect synchronization of both speed and pitch of the blades of the several propellers, thereby ensuring synchronization of the pulls or pushes or reactions of all such propellers on the air wherein the airplane is travelling. Thereby there is assurance that in large airplanes there may be secured the desired balance of forces desirable to ensure perfect control and maneuverability of such airplane. Still it will be noted that I have also made provision for manual control of any selected power-motor and propeller, either as to speed and pitch setting, in case of desirability for such control.

The disclosures of said application Serial No. 459,336 (Patent No. 2,612,956) are full and complete as to the synchronization of speed, and as to provision for manual controls of selected power-motor units.

It is to be understood that although I have, in the drawings, especially in Figures 6 and 8, illustrated cylinders in which there are provided movable pistons or plungers, to effect changes of volume, and thus corresponding changes of displacement, still it is evident that other arrangements in which the volumetric displacements of the contained liquid may be effected, may be used. Thus, for example, use may be made of such devices as those well known in the arts under the name of Sylphons, being deeply corrugated thin sheet metal cylinders made by the Fulton Manufacturing Company, of Knoxville, Tenn., among other manufacturing companies engaged in the business of supplying such devices. In my application Serial No. 573,382, filed January 18, 1945, and issued into Patent No. 2,569,444 on October 2, 1951, of which former application the present application is a division, I have shown such a Sylphon arrangement for a liquid cylinder in Figure 9, for example. Therefore where in the claims to follow I use the expression "blade-pitch control plunger" or "displacement plunger" or like expressions, it will be understood that I include in such expressions and like expressions all equivalent constructions or devices which will accomplish the desired and intended functions, including in such equivalent devices such deeply corrugated wall collapsible devices as are well known under the name or designation of "Sylphons" and like devices; such devices being of form such that the "plungers" thereof are integrated with the "cylinder" walls so that there can be no loss of liquid at movable joints or intended seals, and the like.

I claim:

1. In a multi-motored installation including a plurality of variable blade-pitch propellers and means to drive said propellers, means to control blade-pitches of the propellers including in combination a blade-pitch control cylinder for each propeller, a positive displacement blade-pitch control plunger working in the blade-pitch control cylinder of each propeller, means connecting each blade-pitch control plunger and the blades of the corresponding propeller effective to cause blade-pitch variation simultaneously with the shift of such plunger in its cylinder, together with means to actuate the blade-pitch control plungers in the cylinders of the propellers comprising in combination a pair of liquid displacement cylinders corresponding to each of the blade pitch-control cylinders, a displacement plunger in each liquid displacement cylinder, a liquid conduit connecting each end of each blade-pitch control cylinder to one of the liquid displacement cylinders of the pair corresponding to such blade-pitch control cylinder, and means to simultaneously actuate the displacement plungers in all of the liquid displacement cylinders, said means being constituted to cause movement of the plunger of one liquid displacement cylinder of each pair of said cylinders in one direction for displacement of liquid from such cylinder through the conduit connecting such liquid displacement cylinder to one end of the corresponding blade-pitch control cylinder and to cause movement of the other plunger of such pair of liquid displacement plungers in a direction to permit movement of liquid through the conduit connecting the other end of such blade-pitch control cylinder to the other liquid displacement cylinder of such pair of liquid displacement cylinders.

2. Means as specified in claim 1, wherein the displacement plungers of each pair of liquid displacement cylinders are connected together, and wherein the connection between the displacement plungers of each pair includes means to produce equal displacements of both of the plungers corresponding to any movement of said connection.

3. Means as specified in claim 1, wherein the means to simultaneously actuate the displacement plungers in all of the liquid displacement cylinders comprises a rack bar in connection with each displacement plunger, an operating shaft, and gear elements carried by said shaft and meshing with the rack bars of the displacement plungers.

4. Means as specified in claim 1, wherein the means to simultaneously actuate the displacement plungers in all of the liquid displacement cylinders comprises a shaft, means to journal said shaft, the liquid displacement cylinders of each pair being located at opposite sides of said shaft, and wherein the means to actuate the displacement plungers include rack bars connected to the displacement plungers and extending in proximity to said shaft with the rack bars of the plungers of each pair of liquid displacement cylinders located at opposite sides of the shaft, together with gear elements connected to the shaft at locations adjacent to the rack bars of the pairs of plungers, and with the teeth at opposite sides of each gear element in mesh with the rack bars of the adjacent pair of plungers.

5. Means as specified in claim 1, wherein the means to simultaneously actuate the displacement plungers in all of the liquid displacement cylinders includes a common actuating element having two directional movement, and wherein movements of said actuating element in either direction cause simultaneous movements of one displacement plunger of each pair of the liquid displacement cylinders in direction corresponding to the direction of movement of the actuating element to cause displacement of liquid from said liquid displacement cylinders, and also cause simultaneous movements of the other displacement plungers of the pairs of liquid displacement cylinders in direction to permit movement of liquid into the liquid displacement cylinders of said other displacement plungers.

6. Means as specified in claim 5 wherein the two directional movement actuating element comprises a rock shaft, together with means to rock said shaft in either direction, comprising a pair of power cylinders, plungers working in said power cylinders, operative connections from the plungers to the rock shaft effective to rock the shaft simultaneously with plunger movements in said power cylinders, and liquid connections to the power cylinders, together with means to simultaneously supply pressure liquid to either power cylinder and release liquid from the other power cylinder under control.

7. Means as specified in claim 6, wherein the means to simultaneously supply pressure liquid to either power cylinder and release liquid from the other power cylinder under control includes a valve, connections for supply of pressure liquid to said valve and for release of liquid from said valve, connections between said valve and both of the power cylinders, a movable valve element, and connections in said movable valve element to connect the pressure supply connection to either of the power cylinders and to simultaneously connect the release connection to the other one of the power cylinders, selectively, according to the position of the movable valve element, together with means to seal both of the connections between the valve and the power cylinders when the movable valve element is in another selected position.

8. Means as specified in claim 7, together with manual means to actuate said movable valve element.

9. Means as specified in claim 7, together with electric power means to actuate said valve in either direction of its movement and means to control said electric power means for actuation of the valve element in selected direction.

10. Means as specified in claim 9, wherein the means to drive the propellers comprises a combustion fuel motor for each propeller, together with means to meter the fuel delivered to said motors, said metering means including an element which is movable in proportion to the rate of delivery of the fuel to the motors, and means responsive to the speed of said movable element which is movable in proportion to the rate of delivery of the fuel to the motors, effectively to actuate the means to control said electric power means for actuation of the valve element in a selected direction.

11. Means as specified in claim 10, wherein the means which is responsive to the speed of said movable element which is movable in proportion to the rate of delivery of fuel to the motors, is adjustable to adjust the speed of said movable element at which the means to control the electric power means actuates the valve element.

12. Means as specified in claim 11, together with means normally urging the movable valve element to the sealing position.

13. Means as specified in claim 10, wherein there is a common fuel supply conduit for supply of fuel to all of the motors, and wherein said metering means acts to meter the fuel flowing through said common fuel supply conduit.

14. Means as specified in claim 1, together with second means to actuate the blade-pitch control plunger in the blade-pitch control cylinder of each of the propellers, said second means comprising a pressure liquid supply conduit and a liquid release conduit, and valve means for each blade-pitch control cylinder to connect the ends of said blade-pitch control cylinder to the liquid displacement cylinders of the corresponding pair as aforesaid or to the pressure liquid supply conduit and to the liquid release conduit selectively, each such valve means including a valve casing corresponding to the blade-pitch control cylinder, said valve casing comprising a portion of both of the conduits which connect the ends of the corresponding blade-pitch control cylinder to the corresponding pair of the liquid displacement cylinders, each such conduit including a blade-pitch control section between the valve casing and the blade-pitch control cylinder and including a liquid displacement cylinder section between the valve casing and the corresponding blade-pitch control cylinder, the valve casing being provided with ports connecting all of said sections to the valve casing, a connection from the pressure liquid supply conduit into said casing, a connection from the said casing to the liquid release conduit, the valve casing being provided with ports connecting said pressure liquid supply conduit and said liquid release conduit to the valve casing, and a movable valve element in said casing, said movable valve element having control positions including a pressure liquid blade-pitch increase position, a pressure liquid blade-pitch decrease position, and a servo-blade-pitch operation position, and said movable valve element including passages to connect the port of the pressure liquid supply conduit and the port of the liquid release conduit to the two blade-pitch control conduit sections selectively, as determined by the control position of the movable valve element, and to connect the ports of the two blade-pitch control conduit sections to the liquid displacement cylinder sections as determined by movement of the movable valve element to the servo-blade-pitch operation position.

15. Means as specified in claim 14, together with a common operating element for the movable valve elements of all of the blade-pitch control cylinders.

16. Means as specified in claim 15, together with disconnectable means to connect the movable valve elements to said common operating element selectively.

17. Means as specified in claim 14, wherein the movable valve element is provided with a passage to connect the liquid displacement cylinder sections of the two conduits together when said movable valve element is in either the pressure liquid blade-pitch increase position or the pressure liquid blade-pitch decrease position.

18. Means as specified in claim 16, wherein the movable valve element is provided with a passage to connect the liquid displacement cylinder sections of the two conduits together when said movable valve element is in either the pressure liquid blade-pitch increase position or the pressure liquid blade-pitch decrease position.

References Cited in the file of this patent

UNITED STATES PATENTS

| Number | Name | Date |
|---|---|---|
| 2,153,470 | McNeil | Apr. 4, 1939 |
| 2,280,654 | Mader | Apr. 21, 1942 |
| 2,301,434 | McNeil | Nov. 10, 1942 |
| 2,321,024 | Hammond | June 8, 1943 |
| 2,321,025 | Hammond | June 8, 1943 |
| 2,330,070 | Martin et al. | Sept. 21, 1943 |
| 2,352,786 | Hammond et al. | July 4, 1944 |
| 2,354,422 | Roby | July 25, 1944 |
| 2,400,799 | Woods | May 21, 1946 |
| 2,403,243 | Seppeler | July 2, 1946 |
| 2,408,683 | Price | Oct. 1, 1946 |
| 2,557,679 | Nichols | June 19, 1951 |